Jan. 10, 1933.  J. S. GRAHAM  1,893,547
VEHICLE SIGNAL
Filed March 6, 1931  2 Sheets-Sheet 1
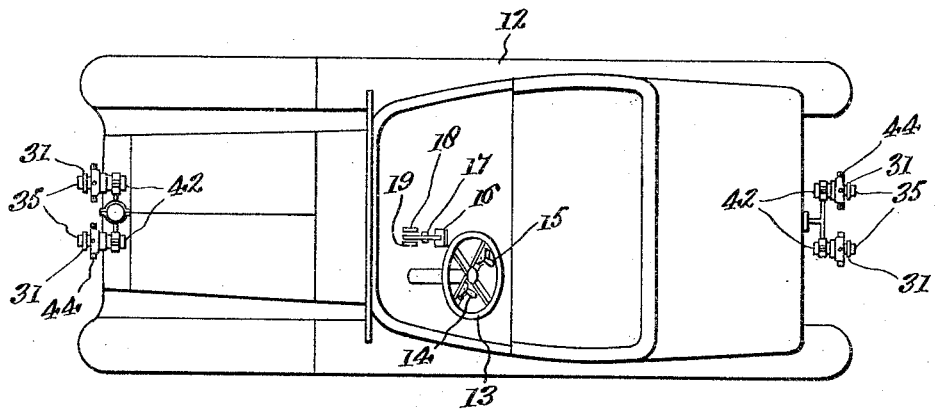
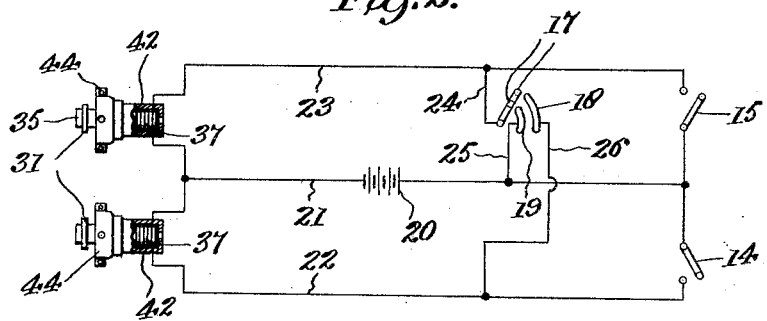
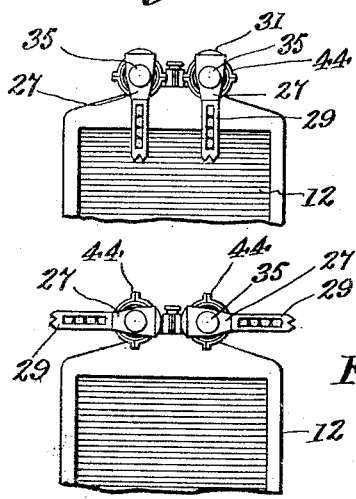
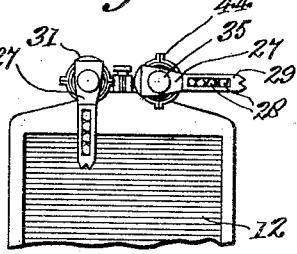
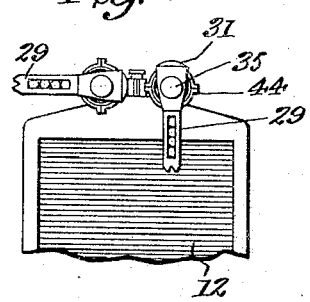
Inventor
John S. Graham
By Wilkinson & Mawhinney
Attorneys Jan. 10, 1933. J. S. GRAHAM 1,893,547
VEHICLE SIGNAL
Filed March 6, 1931 2 Sheets-Sheet 2
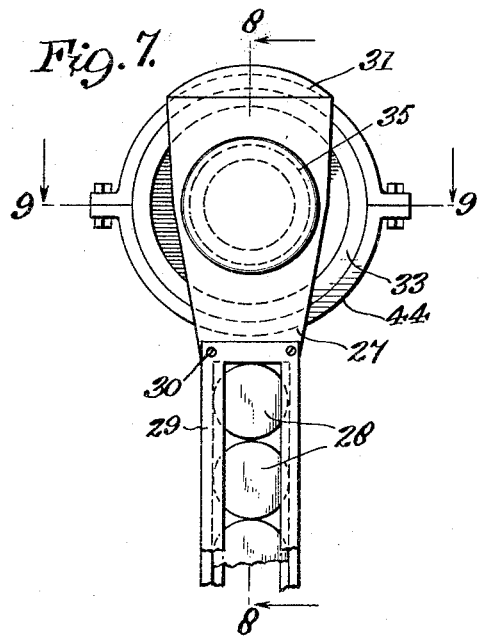
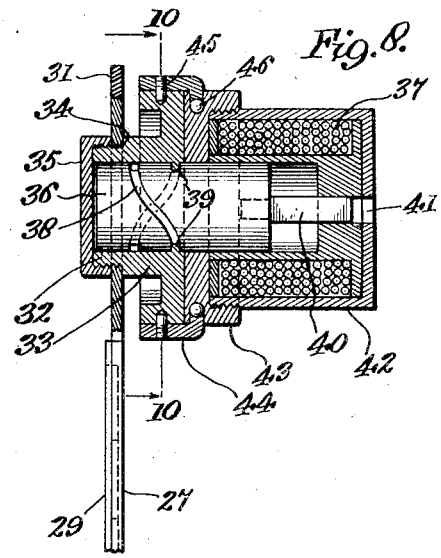
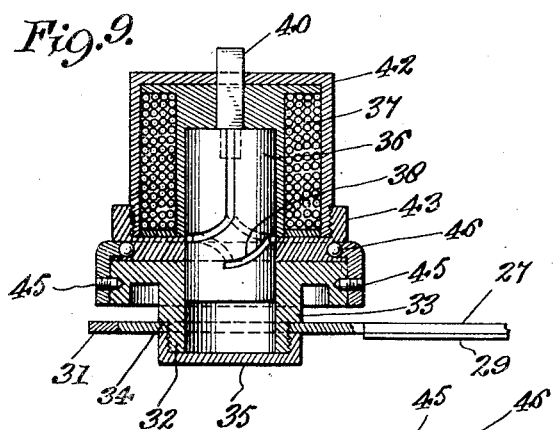
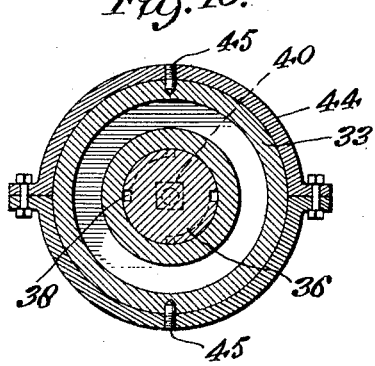
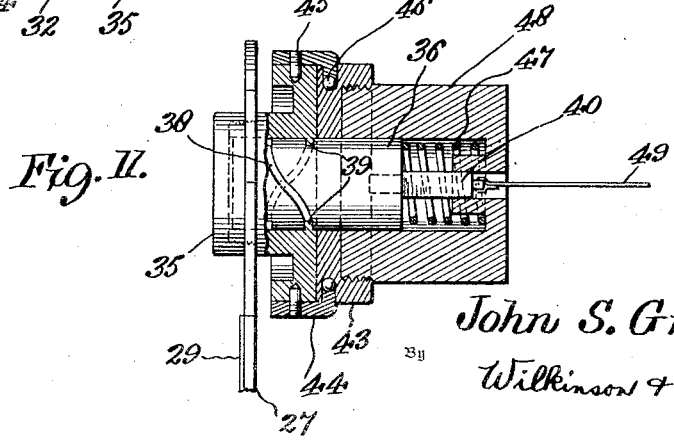
Inventor
John S. Graham
By Wilkinson & Mawhinney
Attorneys Patented Jan. 10, 1933

1,893,547

UNITED STATES PATENT OFFICE

JOHN SISSON GRAHAM, OF BERKELEY, CALIFORNIA

VEHICLE SIGNAL

Application filed March 6, 1931. Serial No. 520,681.

The present invention relates to improvements in vehicle signals, and has for an object to provide certain improvements over the vehicle signals shown and described in my prior U. S. Patent No. 1,458,819, granted June 12, 1923.

It is an object of the invention to provide an improved signal for indicating, both from the front and rear, or other positions, proposed changes in direction of the vehicle, or proposed stopping of the vehicle or backing thereof.

A further object of the invention is to provide an improved semaphore which may operate either singly or in groups, and an improved operating mechanism for such semaphore.

With the foregoing and other objects in view, the invention will be more fully described hereinafter and will be more particularly pointed out in the claims appended hereto.

In the drawings, wherein like symbols refer to like or corresponding parts throughout the several views, Figure 1 is a top plan view of an automobile shown equipped with the improved signals constructed according to the present invention.

Figure 2 is a circuit diagram.

Figures 3, 4, 5, and 6 are diagrammatic showings of the signals on the front portion of the automobile for giving the various signals.

Figure 7 is a fragmentary front view of one of the signal units.

Figure 8 is a longitudinal section taken on the line 8—8 of Figure 7.

Figure 9 is a horizontal section taken on the line 9—9 in Figure 7.

Figure 10 is a vertical cross section taken on the line 10—10 in Figure 8, and

Figure 11 is a cross sectional view showing a modification in which the signal is operated by mechanical means.

Referring more particularly to the drawings, 12 designates an automobile or other vehicle having the steering wheel 13 and right and left hand switches 14 and 15 thereon. The brake pedal is indicated at 16 and carries a contact 17 adapted to wipe over contact segments 18 and 19 as hereinafter more fully described.

As shown in Figure 1, semaphore signals are mounted in pairs at both the front and rear of the vehicle so as to be observable from any or all positions.

In Figure 2, a circuit diagram is shown, in which the storage battery of the vehicle is shown as connected by the common return wire 21 to two independent circuits comprising the circuit 21, 22 and the circuit 21, 23.

The circuit 21, 22 is arranged to be closed by the switch 14 upon the steering wheel 13; while the other circuit 21, 23 is opened and closed by means of the switch 15 upon the right side of the steering wheel 13. Moreover, both circuits are adapted to be closed simultaneously, independently of the switches 14 and 15 by the contact controlled by the brake pedal 16. The brake pedal may be connected by a wire 24 with the conductor 23, while the segment 19 is connected by a wire 25 with the return side 21 of both circuits. The other sector 18 is coupled by a wire 26 with the conductor 22. Therefore, when the brake pedal 16 is depressed and its contact 17 wiped across the sectors 18 and 19, both of the circuits 21, 22 and 21, 23 will be closed; whereby both of the signals included in such circuits will be energized and operated.

Now these signals are more particularly shown in Figures 7, 8, 9, and 10, in which the semaphore arm is designated at 27, the same having an elongated dependant portion, countersunk to receive a number of reflectors 28 which are held in the depressed portion of the semaphore arm by means of an open rectangular frame 29 secured removably to the semaphore arm by any appropriate fastenings, for instance, by the screws 30.

The upper portion of the semaphore arm is counterbalanced, as indicated at 31, it being the intention to have the semaphore arm seek a vertical position by gravity, so that it will return to this vertical position, indicated in Figure 3, whenever the device is de-energized.

The semaphore arm is mounted over a reduced threaded neck 32 of a carrier ring 33 and abuts against a shoulder 34 of the carrier ring. A cap piece 35 is screwed upon the reduced neck 32 and acts to firmly bind the semaphore arm upon such carrier ring 33. The carrier ring 33 is rotatably mounted about the axially sliding armature or core 36 of the electro-magnet 37. The core or armature 36 is traversed by one or more spiral grooves 38 engaged by driving lugs 39 of the carrier ring 33. The armature or core 36 is held against rotation by means of a square or other non-circular guide member 40, which is carried by the electro-magnet 37 and projects through a square or other non-circular opening 41 in the electro-magnet frame.

The coils of the electro-magnet 37 are housed within the housing 42, to which is secured the bearing washer 43. In this bearing washer is formed a portion of a ball race, the other complemental portion of which is formed in the securing ring 44 held removably as by the fastenings 45 to the carrier ring 33. The ball bearings 46 are mounted in the ball race.

In accordance with Figure 11, a modified form of the invention is shown, in which the electro-magnet is dispensed with and a coil spring 47 forming a spring motor is mounted within the casing 48 and connected to the core 36. A guide 40 is connected by an operating wire or cable 49 to a point in the vehicle wherein the same can be pulled upon by the driver, whereby to draw the core 36 back, compressing the spring 47 and operating the semaphore.

Now, in the operation of the device, when the electro-magnet, shown in Figure 8, is energized, or when the cord 49 is pulled upon, the armature or core 36 will be drawn into the electro-magnet or casing, but this core will be prevented from rotating by reason of the square guide member 40 operating in the square guide opening 41. The driving lugs 39 will, however, travel in the spiral grooves 38 to rotate the carrier ring 33 and with it the semaphore signal 27. This action will be facilitated by reason of the ball bearings 46 which are also positioned and arranged in combination with the ring 44 to take up lateral thrust and torque strains and reduce friction.

The devices are preferably grouped in couples, as indicated in Figures 3, 4, 5 and 6, and also in Figure 1, two such signal members being mounted in the front and two at the rear of the vehicle. The signal members normally drop down, as indicated in Figure 3, seeking this position by gravity.

Figure 4 shows the front signal members as seen from operator's position raised to the horizontal position indicating a turn of the vehicle to the left. The other semaphore arm remains in the drooping inoperative position.

Figure 5 shows the reverse positions of the semaphore signals indicating a turn to the right.

Figure 6 shows both semaphore arms raised to the horizontal position, which is the condition arrived at when the brake pedal 16 is depressed and when the contact 17 of the brake pedal makes connection with both of the sectors 18 and 19, closing both circuits. This indicates an application of the brakes or the stopping or slowing down. The device may also be arranged to give a conventional signal indicating that the vehicle desires to back. This may be accomplished by stepping upon and releasing the brake pedal 16 alternately a number of times which will communicate to the semaphore signal a waving arm motion. It is obvious that this waving motion may be used for other purposes if determined upon.

The sectors 18 and 19 are preferably of shorter length than the throw of the brake pedal 16. This shortness will preferably occur at both ends of the movement of the brake pedal 16. In other words, when the brake pedal is in the "off" position, there will, of course, be no contact and no closing of the circuits. Also in the fully applied position of the brake pedal 16, the contact 17 will have moved off the sectors 18 and 19, thus opening the circuits. This is for the purpose of allowing of the giving of signals while the car is stopped with the brake applied, as occurs many times at intersections where light signals are placed and in traffic jams and when the car is upon a hill and is required to make a stop where it is necessary to maintain the brake on. In all such cases while the car is held by the brake in a stopped position, the signal circuits are open and free, and they may be closed selectively or simultaneously by use of the hand buttons or switches 14 and 15 and thus communicate to the traffic officer or to all observers front and rear the intended movement of the vehicle as soon as the traffic signal or traffic tangle permits of its movement. In other words, the contact with the sectors 18 and 19 will only occur during the intermediate position of the brake pedal 16.

It will be appreciated that with the use of the improved invention, approach to a vehicle cannot be made from any direction without sighting a signal. This protects the vehicle carrying the signals as well as all persons and vehicles.

The signals, of course, may be used singly or in groups, preferably in pairs, arranged to fulfill the demands of complete protection.

The improved signal devices can be operated electrically or by manual or mechanical power from a position convenient to the operator, who thus is enabled to set the signal before making a change in direction or a change in speed of the vehicle. Thus, both hands of the operator are left free to control and operate the vehicle.

It will be seen that the signal and the signal system is simple and practicable.

Neon or other lights may be used where desirable in connection with the signal.

The signal may indicate from the front, rear or any other position, for instance, where a truck carries a trailer, the rear signal or additional rear signal could be placed at the rear and in a position suitable for visibility on the trailer, though perhaps only a temporary position for the time being.

It will be obvious that various changes in the construction, combination and arrangement of parts could be made, which could be used without departing from the spirit of my invention, and I do not mean to limit the invention to such details, except as particularly pointed out in the claims.

Having thus described my invention, what I claim and desire to secure by Letters Patent of the United States is:—

1. An actuating mechanism for signals comprising a casing, an electro magnetic coil housed in the casing, a core mounted in the coil and adapted to slide in one direction by the action of said coil, means for preventing the rotation of said core when sliding, a bearing washer mounted on said casing to hold the coil in position and to provide a support for the core, a carrier ring mounted over said core and rotated thereby, a member attached to the carrier ring to rotate therewith and to provide means for restoring the parts to initial position when said coil is released, and a securing ring mounted between said carrier ring and the bearing washer.

2. An actuating mechanism for signals, comprising a casing, an electro magnetic coil housed in the casing, a slidable core mounted in the coil, a carrier ring mounted over said core adjacent the casing and rotated by the core, a bearing washer between the casing and carrier ring, a securing ring between said carrier ring and the bearing washer, ball bearings between said securing ring and the bearing washer, and a member mounted on said carrier ring to rotate therewith.

3. An actuating mechanism for signals comprising a casing, a core mounted to slide in the casing, the said core having spiral grooves cut therein adjacent one end, means for preventing the rotation of the core when sliding, a bearing washer mounted on said casing adapted to support the core, a carrier ring mounted over said core and provided with internal lugs to engage the spiral grooves in the core, a member externally supported on the carrier ring to rotate therewith, a securing ring mounted between the carrier ring and the bearing washer, and means for sliding the core in one direction whereby the member supported by the carrier ring is positioned to rotate the latter and restore the parts to initial position when the first named means are released.

JOHN SISSON GRAHAM.